United States Patent
Corcoran et al.

(10) Patent No.: US 6,449,689 B1
(45) Date of Patent: Sep. 10, 2002

(54) SYSTEM AND METHOD FOR EFFICIENTLY STORING COMPRESSED DATA ON A HARD DISK DRIVE

(75) Inventors: Brian Jeffrey Corcoran, Oro Valley, AZ (US); John Lewis Hufferd, San Jose; Shanker Singh, Morgan Hill, both of CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/386,599

(22) Filed: Aug. 31, 1999

(51) Int. Cl.$^7$ ............................................. G06F 12/12
(52) U.S. Cl. ..................... 711/113; 711/133; 711/159; 711/173
(58) Field of Search ........................... 711/133, 134, 711/136, 154, 159, 100, 161, 105, 1, 111, 112, 114, 113; 710/68; 707/101; 360/8

(56) References Cited

U.S. PATENT DOCUMENTS

| | | | |
|---|---|---|---|
| 4,607,346 A | 8/1986 | Hill | 711/170 |
| 5,210,866 A | 5/1993 | Milligan et al. | 714/6 |
| 5,237,460 A | 8/1993 | Miller et al. | 360/8 |
| 5,237,675 A | 8/1993 | Hannon, Jr. | 710/68 |
| 5,247,638 A | 9/1993 | O'Brien et al. | 710/68 |
| 5,247,660 A | 9/1993 | Ashcraft et al. | 707/205 |
| 5,406,278 A | 4/1995 | Graybill et al. | 341/51 |
| 5,438,671 A | 8/1995 | Miles | 709/247 |
| 5,490,260 A | 2/1996 | Miller et al. | 711/100 |
| 5,537,588 A | 7/1996 | Engelmann et al. | 707/202 |
| 5,640,158 A | 6/1997 | Okayama et al. | 341/51 |
| 5,649,151 A | 7/1997 | Chu et al. | 711/14 |
| 5,659,755 A | 8/1997 | Strohacker | 708/203 |
| 5,671,390 A * | 9/1997 | Brady et al. | 711/113 |
| 5,721,858 A | 2/1998 | White et al. | 711/203 |
| 5,758,050 A | 5/1998 | Brady et al. | 714/1 |
| 5,778,255 A | 7/1998 | Clark et al. | 710/68 |
| 5,805,086 A | 9/1998 | Brown et al. | 341/51 |
| 5,838,964 A | 11/1998 | Gubser | 707/101 |

OTHER PUBLICATIONS

Atari, "Atari Home Computer System: Operating System User's Manual", (c) 1982, pp. 89–96.*
"Extendable Random Access Memory File System," *IBM Technical Disclosure Bulletin*, vol. 38, No. 05, May 1995.
"High–Speed Data Transfer Utility," *IBM Technical Disclosure Bulletin*, vol. 33, No. 12, May 1991.
"Automatic Data Compression Control for Hibernation," *IBM Technical Disclosure Bulletin* vol. 39, No. 04, Apr. 1996.

* cited by examiner

*Primary Examiner*—Matthew Kim
*Assistant Examiner*—Brian R. Peugh
(74) *Attorney, Agent, or Firm*—Sawyer Law Group LLP

(57) ABSTRACT

A system and method for organizing compressed data on a storage disk to increase storage density. The method and system include a compressor for compressing a data block into a compressed data block, wherein N represents a compression ratio. The storage disk includes a first storage partition having N slots for storing compressed data, and a second storage partition also having N slots for storing overflow data. Each of the N slots in the first partition includes at least one address pointer for pointing to locations in the second partition. According to a further aspect of the system and method, if the compressed data block is less than or equal to 1/N of the data block size, then the compressed data block is stored in a first slot in the first storage partition. If the compressed data block is greater than 1/N of the data block size, then the first 1/N of the compressed data block is stored in the first slot in the first storage partition and a remainder of the compressed block is stored in one or more slots in the second storage partition. The address pointer in the first slot is then updated to point to the one or more slots in the second storage partition.

3 Claims, 4 Drawing Sheets

SYSTEM AND METHOD FOR EFFICIENTLY STORING COMPRESSED DATA ON A HARD DISK DRIVE

CROSS-REFERENCE TO RELATED APPLICATION

The present invention is related to U.S. patent application Ser. No. 09/387,203 now U.S. Pat. No. 6,230,300, entitled "System And Method For Storing Compressed And Uncompressed Data On A Hard Disk Drive;" which is assigned to the Assignee of the present application and filed on the same date as the present application

FIELD OF THE INVENTION

The present invention relates to storing data on a hard disk drive, and more particularly to system and method for organizing compressed data on a hard disk drive to increase storage density, while reducing complexity.

BACKGROUND OF THE INVENTION

Typically, hard disk drives (HDD) are formatted physically and logically. Physically, a disk is divided into many equal-sized regions, such as sectors (pie slices) and tracks (concentric circles), so that data can be recorded in a logical manner and accessed quickly by read/write heads that move back and for the over the disk as it spins. Logically, a disk is formatted according to the standards of a host operating system. In a personal computer (PC) for example, the operating system treats the HDD as a sequential list of 512-byte block addresses.

To increase the storage capacity of HDD's, data may be compressed before storage. Basic data compression can be inefficient, however, when the data compresses to a size smaller than the standard block size of the system because the unused portion of a block become unavailable for future storage and will go unused. Assume for example that a 512-byte data block compresses at a ratio of 2:1, yielding 256-bytes. Storing the 256-byte data block into a 512 k-byte logical block on a hard drive results 256-byte of wasted storage space.

A more complex and advanced compression scheme based on log structure array (LSA) is a concept often used in large, high-performance storage systems. LSA is capable of providing data management in direct access storage systems (DASD) where HDD's are organized as a redundant array of inexpensive disks (RAID). In such DASD systems, LSA is also used to manage compressed data using a log-structured file system (LSF). LSF attempts to provide improved disk performance by maintaining large free areas on the HDD in order to speed up writes to the disks. To manage the HDD's in such a manner, each HDD in the RAID is interfaced with a hard disk assembly (HDA) circuit board, which includes a HDD controller, a buffer memory, and the LSF compression support circuit.

In operation, the LSF compression support circuit allows for the use of storage space left over when compressed data is stored in a logical block. For example, assume that a 512-byte data block compresses at a ratio of 4:1, yielding 128-bytes, then the data would be stored in the first 128-bytes of a 512-byte hard disk block, leaving 384-bytes free. If a second 512-byte data block compresses at a ratio of 2:1, then the resulting 256-bytes is stored in the same data block, which now has 128-bytes free. If a third data block is to be stored that is larger than 128-bytes, then the first 128-bytes of the data would be stored in the remainder of the disk block, and the rest would be stored in an overflow location. Alternatively, LSF may attempt to free more space with the storage block by moving previously stored data to a different block or by deleting old, unused data during a complex background process.

A LSA algorithm can also handle compression for two or more disk or a RAID. Through hardware or software functionality, multiple physical disks are treated as one logical disk to prevent data loss in case of a single HDD crash. The parity bit for each data block, which is used for error recovery, is either stored on a separate drive or spread across many drives for different data blocks. LSA is used to manage both the compression of the data and the byte-parity error-recovery process, adding to its complexity.

Although the capacity of buffer memories and HDD's continues to increase, so does the requirement for storage as evidenced by the rise of digital imaging applications. Therefore, the need for efficient data compression to provide increased storage capacity will continue. However, today's storage intensive devices, such as digital cameras for example, continue to decrease in size and cannot accommodate traditional HDA circuit boards. It has been anticipated that this problem will be overcome by replacing traditional HDA circuit boards with a single chip that includes the HDD controller, a large capacity buffer memory, and a data compression/decompression engine. However, a scheme such as LSA is too complex to provide the necessary support for LSA on such a small scale.

Accordingly, what is needed is a simplified system and method for efficiently storing compressed data on a hard disk drive that can be implemented on a single chip HDD controller. The present invention addresses such a need.

SUMMARY OF THE INVENTION

The present invention provides a system and method for organizing compressed data on a storage disk to increase storage density. The method and system include a compressor for compressing a data block into a compressed data block, wherein N represents a compression ratio. The storage disk includes a first storage partition having N slots for storing compressed data, and a second storage partition also having N slots for storing overflow data. Each of the N slots in the first partition includes at least one address pointer for pointing to locations in the second partition.

According to a further aspect of the system and method disclosed herein, if the compressed data block is less than or equal to 1/N of the data block size, then the compressed data block is stored in a first slot in the first storage partition. If the compressed data block is greater than 1/N of the data block size, then the first 1/N of the compressed data block is stored in the first slot in the first storage partition and a remainder of the compressed block is stored in one or more slots in the second storage partition. The address pointers in the first slot point to the one or more slots in the second storage partition.

The present invention provides improved storage efficiency over prior methods at the cost of adding a minimal complexity, which will be acceptable in future HDD's and can easily be integrated in a single chip HDD controller, due to anticipated advancements in support electronics in VLSI.

DETAILED DESCRIPTION

The present invention relates to a system and method for organizing compressed data on a hard disk drive to increase storage density. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
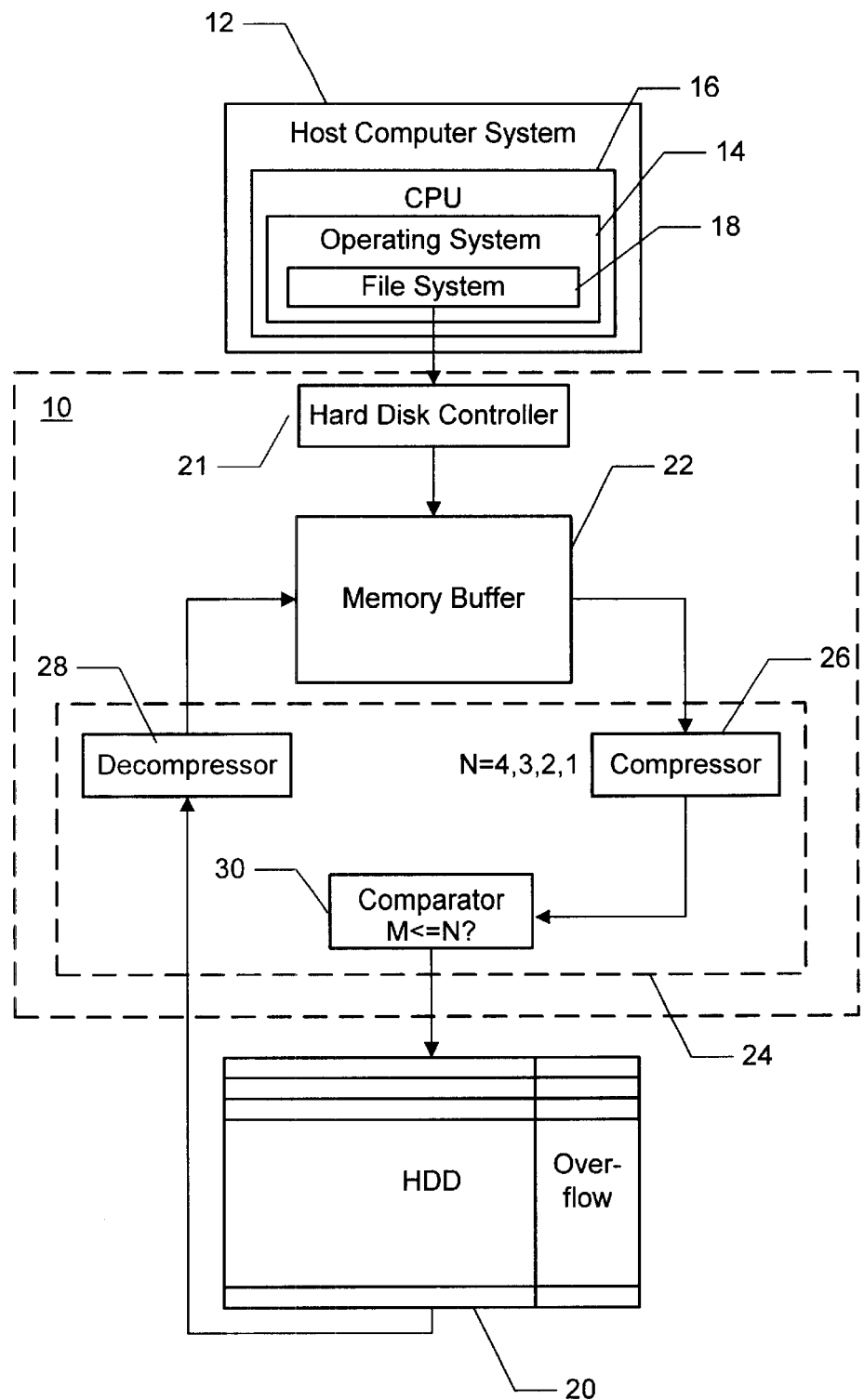
FIG. 1 is a block diagram illustrating a storage system for use with the present invention.

FIG. 1 is a block diagram illustrating a HDA storage system 10 for use with the present invention. The storage system 10 is used by or in conjunction with host computer system 12 running an operating system 14 on a CPU 16. Requests for data transfers between the operating system 14 and the storage system 10 are typically handled by a file system 18.

The storage system 10 includes a hard disk drive (HDD) 20, a disk controller 21, a buffer memory 22, and a compression/decompression engine 24. The HDD 20 is the storage medium for the host computer system 12, and is formatted in accordance with the file system 18 of the operating system 14. For DOS compatible file systems 18, the HDD 20 is logically formatted in 512-byte fixed-sized storage blocks.

The disk controller 21 is a circuit that communicates with the file system 18 and controls transmission of data to and from the HDD 20. The buffer memory 22 is a section of memory that caches data between the HDD 20 and the CPU. The buffer memory 22 may also be referred to as a disk cache. The compression/decompression engine 24 is coupled to the disk controller 21, the HDD 20 and the buffer memory 22 for compressing data to be written to the HDD 20, storing the compressed data on the HDD 20 in accordance with the present invention, and decompressing data that is to be read from the HDD 20.

In a preferred embodiment, the compression/decompression engine 24 includes a separate compressor 26 and decompressor 28 for performing compression and decompression, respectively, although other implementations are also suitable. The compression/decompression engine 24 also includes a compression ratio comparator 30 (also known as a compression sniffer), which functions as explained below.

In operation, an application (not shown) executing on the host computer system 12 makes request to write and read data to and from the HDD 20. When the disk controller 21 receives a request to write data to the HDD 20, the disk controller 21 queues up data blocks in the buffer memory 22 at high speed and then writes them to HDD 20 during idle CPU cycles via the compressor 26. When the disk controller 21 receives a request to read data from the HDD 20, the disk controller 21 reads a larger number of data blocks from the HDD 20 than what was requested and copies them into the cache 22 via the decompressor 28. If subsequent requests for data can be satisfied with data blocks from in the cache 22, a much slower HDD 20 access is not required.

Since the memory buffer 22 is relatively large (8–32 MB), most of the data needed by an executing application will be transferred to and from the memory buffer 22. After execution, any remaining data in the memory buffer 22 will be transferred to the HDD 20 for compression and storage, as described below. As the data is being compressed, the comparator 30 keeps tracks of compression ratios of the data blocks during compression and compiles and average compression ratio N. Alternatively, the comparator 30 may estimate the average compression ratio N as data is written into the memory buffer 22 during application execution.

The present invention addresses how to organize and store the compressed data blocks on the HDD 20. The Applicants of the present invention have disclosed a simple data compression scheme in U.S. patent application Ser. No. 09/387,203, entitled "System And Method For Organizing Compressed And Uncompressed Data On A Hard Disk Drive", filed on the same date as the present invention. This compression scheme partitioned the HDD 20 into two distinct areas, a storage partition and an overflow partition. The blocks in the storage partition were further partitioned into data slots each having a size of 1/N, where N is the data compression ratio and 1 implies the normal uncompressed data block size. Data that could be compressed to 1/N size were stored in the slots in the storage partition. The blocks in the overflow partition were not divided into slots and were used to store data that could not be entirely compressed to 1/N size. Address pointers pointing to the uncompressed data blocks in the overflow partition were kept in the corresponding slots in the storage partition.

Although this compression scheme effectively increases the storage size of the HDD 20, the scheme includes inefficiencies. Since the addresses of the overflow blocks are contained in slots in the storage partition, which would normally contain compressed data, the storage space of the HDD 20 is diminished because some of the slots will merely contain the address pointers of the uncompressed data in the overflow partition.

The present invention provides an improved system and method for organizing compressed data on the HDD 20 to increase storage density. To more particularly describe the features of the present invention refer now to FIG. 2.

Figure 2:
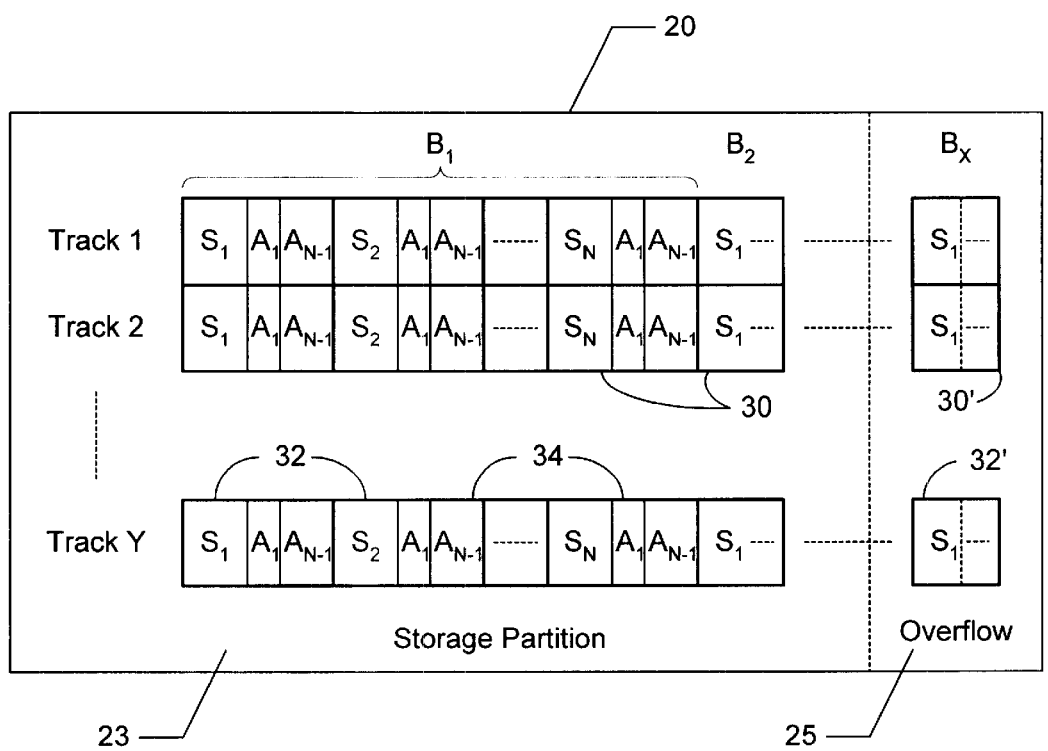
FIG. 2 is a block diagram illustrating the organization of a HDD in accordance with the present invention.

FIG. 2 is a block diagram illustrating the organization of a HDD 20 in accordance with the present invention. The HDD 20 includes one or more tracks, each containing fixed-size storage blocks 30 ($B_1$, $B_2$, ..., $B_x$). The HDD 20 is partitioned into a storage partition 23, and an overflow partition 25.

The present invention utilizes the average compression ratio N to partition the blocks 30 in both the storage partition and the overflow partition into N slots ($S_1$, $S_2$, ..., $S_N$), where each slot is slightly larger than 1/N bytes of a HDD block 30. In a preferred embodiment, the slots 32 are slightly larger than 1/N of a block 30 because they also contain address pointers 34 that point to overflow slot 32' addresses. Therefore, the slots 32 in both partitions are 1/N the size of a HDD block 30 for storing compressed data plus bytes to store N−1 address ($A_1$, ..., $A_{N-1}$).

Since the size of the slots is based on the average compression ratio N, a majority of the compressed data blocks will fit into one slot 32. Any data blocks that fail to compress at least average will be partially stored in the overflow partition 25. That is, in the rare instances where the size of a compressed data block is larger than 1/N, the first 1/N of the compressed data is stored in a storage partition slot 32. The remainder of the compressed data block is stored in as many overflow slots 32' that are needed to contain the data. The address pointers 34 within the storage partition slot 32 containing the compressed data are updated to point to the locations of the overflow slots 32'.

To determine whether compressed data will fit into one storage partition slot 32 or will also need to be stored in the overflow partition 25, the compression ratio comparator 30 (FIG. 2) determines a compression ratio (M) of a current compressed data block and compares it with the average compression ratio (N). If M is less than or equal to N, then the data block compressed at or more than average, and the compressed data is stored in a storage partition slot 32. If M is greater than N, then the data block compressed less than average and the first 1/N of the compressed data will be stored in a storage partition slot 32, and the remaining portion of the compressed data will be stored in one or more overflow partition slots 32'. Thus, according to the present invention, storage partition slots 32 will contain either the whole compressed data (if it did reduce to size $\leq 1/N$) or only the first 1/N portion of the compressed data.

Figure 3A:
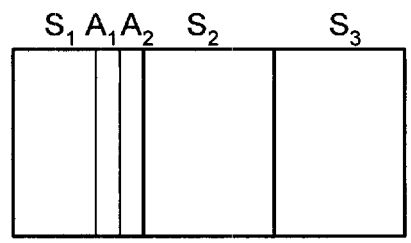
FIGS. 3A–3C are diagrams illustrating example compression and organizational scenarios in accordance with the present invention.
Figure 3B:
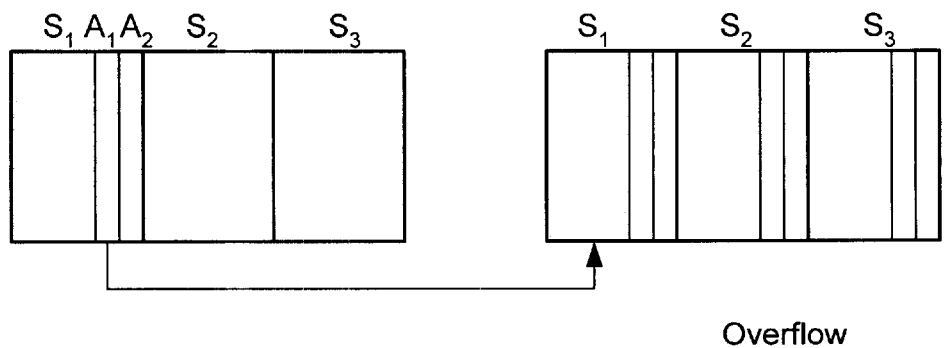
Figure 3C:
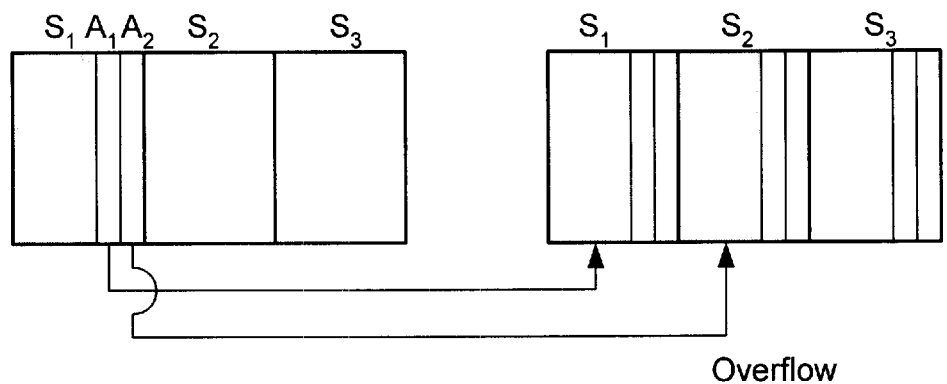

To better understand the operation of the slots and the organization of compressed data on the HDD 20, consider the following example with reference to FIGS. 3A–3C. Assume that in the system of FIG. 1 an uncompressed data block and a HDD block 30 are both 512-bytes in size and that an address pointer 34 is 4-bytes long. Assume further that the average compression ratio of data blocks is 3:1 (N=3).

According to the present invention, the HDD 20 blocks in the storage partition 23 and the overflow partition 25 will be divided into N (3) slots (S1, S2, S3), each 172-bytes (512/3) in size. Each slot will include space to accommodate N−1 (2) address pointers (A1, A2), which is an additional 8-bytes. Therefore, the total slot size is 180-bytes.

In scenario 1 shown in FIG. 3A, assume that a data block compresses to ⅓ its size (or $\leq$ to 172 bytes). The compressed data, shown by the shading is stored in the slot S1 in the storage partition and its two address pointers are set to null because there is no compressed data stored in the overflow partition.

In scenario 2 shown in FIG. 3B, assume that a data block compresses to ⅔ its size (or $\leq$ to 344 bytes). The compressed data is stored in two slots, one in the storage partition and one in the overflow partition. The address for the overflow partition slot is contained in one of the address pointers residing in the storage partition slot. The second address is set to null.

In scenario 3 shown in FIG. 3C, assume that a data block compresses to ⅗ its size or 1, meaning that there is no compression (512 bytes). The compressed data is stored in three slots, one in the storage partition and two in the overflow partition. The two address pointers residing in the storage partition slot point to the location of the two slots in the overflow partition.

Referring again to FIG. 1, in a preferred embodiment of the present invention, the overflow partition may comprise approximately ten percent of the HDD 20. The host file system 18 is unaware of overflow partition, which is controlled by the disk controller 21. The file system 18 only sends requests to the disk controller 21 to transfer data to and from the storage partition 23. In response to an overflow situation from the comparator 30, the disk controller 21 finds empty slots 32' in the overflow partition and provides the address of slots 32' where overflow data can be read or written. It appears to the file system 18 therefore, that all data blocks are compressed. Once the overflow partition 25 becomes full, the disk controller 21 causes a unique interrupt. This unique interrupt is cooperatively handled by the file system 18 and the disk controller 21 to resolve the situation after further testing of the total available space.

One disadvantage of partitioning the HDD 20 blocks into slots is that it results in a large number of slots 32, which the disk controller 21 must sort through to find empty slots for storage. Consider for example a ten-gigabyte HDD 20 having 1 K-sized blocks. One million pointers would be necessary to point to all the blocks on the HDD 20. If each block is partitioned into three slots, then three million pointers are necessary.

Figure 4:
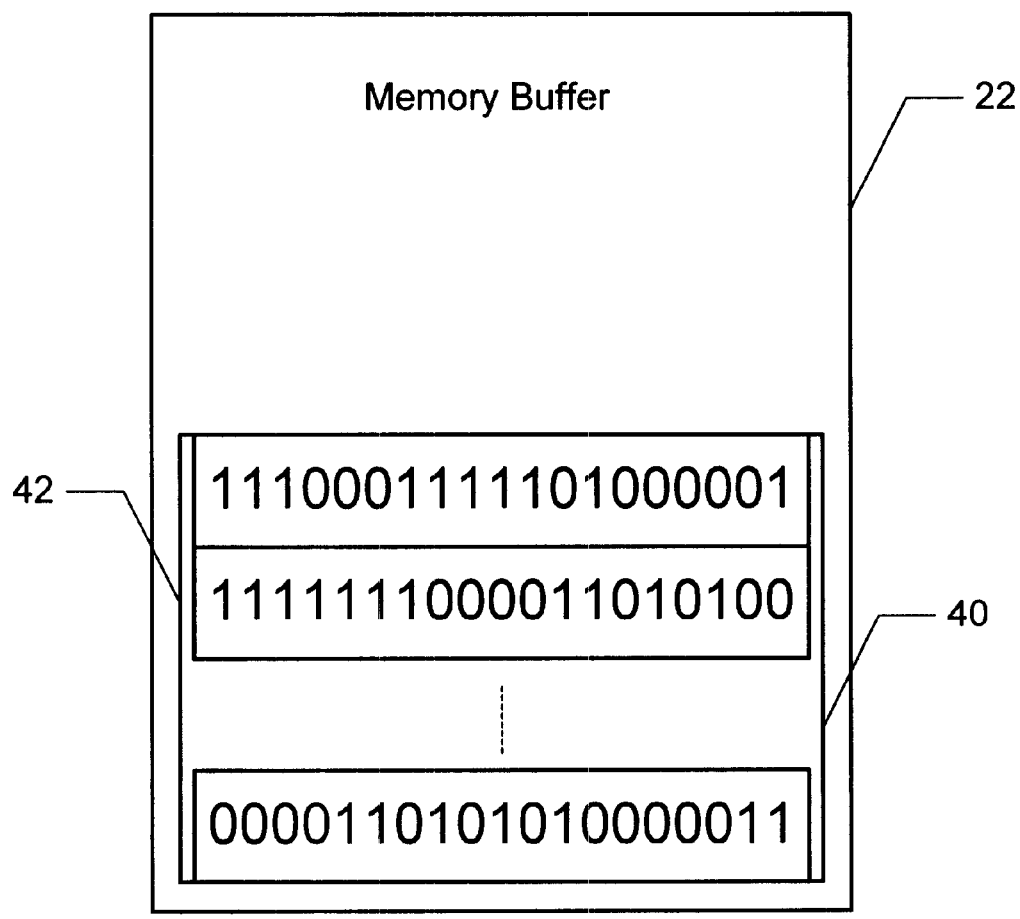
FIG. 4 is a diagram illustrating a bit map in the buffer memory for keeping track of empty slots, where each bit in the bit map corresponds to one slot on the HDD.

Referring now to FIG. 4, the present invention provides a bit map 40 in the buffer memory 22 to keep track of empty slots, where each bit in the bit map 40 corresponds to one slot on the HDD 20. A bit containing a one indicates the slot 32 is full, while a zero indicates the slot 32 is empty. The bits are organized as a series of P-bit words 42 (preferably 32-bits), where each bit address is the word address plus the bit position. A bit address, in turn, points to a slot address.

The disk controller 21 manages the bit map 40, updating it whenever data is written or deleted from the HDD 20. When the system is powered off, the bit map 40 is stored on the HDD 20, and recovered when the system power is restored. To store a compressed data block, the disk controller 21 merely needs to find a bit(s) in the bit map having "0" bit values. When a write request is received, the disk controller 18 is not required to find the location of empty slots because the addresses of the empty slots from the words are prestored in registers. Thus, the bit map 40 provides an efficient way to find empty slots.

A simple and yet storage efficient system and method for storing compressed data on a HDD 20 has been disclosed. Due to advancements in VLSI chip technology, all hardware support needed to manage the compressed data can be integrated in a single chip HDD controller that includes a memory buffer and host logic interface.

Although the present invention has been described in accordance with the embodiments shown, one of ordinary skill in the art will readily recognize that there could be variations to the embodiments and those variations would be within the spirit and scope of the present invention. Accordingly, many modifications may be made by one or ordinary skill in the art without departing from the spirit and scope of the appended claims.

What is claimed is:

1. A storage system for organizing compressed data on a disk from a host system, comprising;

a disk controller for controlling storage of data in a first storage partition and an overflow partition;

a compressor coupled to the disk controller for compressing a data block into a compressed data block, wherein $N \geq 1$ represents a compression ratio; and a storage disk coupled to the compressor, where the compressor also decompresses data that is to be read from the storage disk, the storage disk including, the first storage partition and the overflow partition, wherein the first portion having a first block partioned into N slots for storing the compressed data block, wherein the slots in the first block have a size of 1/N of the first block size plus space for the at least one address pointer, and the overflow partition having a second block partitioned into N slots for storing overflow data, wherein each of the N slots in the first partition include at least one address pointer for pointing to a location in the overflow partition, wherein if the compressed data block is less than or equal to 1/N of the data block size, then the compressed data block is stored in a first slot in the first storage partition, and if the compressed data block is greater than 1/N of the data block size, then the first 1/N of the compressed data block is stored in the first slot in the first storage partition and a remainder of the compressed block is stored in one or more slots in the overflow partition, and the address pointer points to the one or more slots in the overflow partition, whereby storage density of the storage disk is increased; and a buffer memory coupled to the compressor for caching data between the storage disk and the host system, wherein the buffer memory includes a bit map for managing empty slots, each bit in the bit map corresponding to one slot on the storage disk, wherein a one in a bit in the bit map indicates a corresponding slot is full, and a zero indicates the corresponding slot is empty, and wherein the bits are organized in P-bit words, each word having a word address, wherein each bit address is equal to the word address plus a position of the bit in the word, and the bit address indicates an address of the corresponding slot.

2. A storage system for organizing compressed data on a disk from a host system, comprising;

a disk controller for controlling storage of the compressed data in a first storage partition and an overflow partition;

a compressor coupled to the disk controller for compressing a data block into a compressed data block, wherein $N \geq 1$ represents a compression ratio; and a storage disk coupled to the compressor, where the compressor also decompresses data that is to be read from the storage disk, the storage disk including, a first storage partition and an overflow partition, wherein the first portion having a first block partioned into N slots for storing the compressed data block, where each of the N slots includes at least one address pointer, and the overflow partition having a second block partitioned N slots for storing overflow data, wherein if the compressed data block is less than or equal to 1/N of the data block size, then the compressed data block is stored in a first slot in the first storage partition, and if the compressed data block is greater than 1/N of the data block size, then the first 1/N of the compressed data block is stored in the first slot in the first storage partition and a remainder of the compressed block is stored in one or more slots in the overflow partition, and the address pointer is updated to point to the one or more slots in the overflow partition, whereby storage density of the storage disk is increased; and a buffer memory coupled to the compressor for caching data between the storage disk and the host system, wherein the buffer memory includes a bit map for managing empty slots, each bit in the bit map corresponding to one slot on the storage disk, wherein a one in a bit in the bit map indicates a corresponding slot is full, and a zero indicates the corresponding slot is empty, and wherein the bits are organized in P-bit words, each word having a word address, wherein each bit address is equal to the word address plus a position of the bit in the word, and the bit address indicates an address of the corresponding slot.

3. A method for organizing compressed data on a hard disk, comprising the steps of:

(a) partitioning the hard disk comprising a plurality of blocks into a storage partition and an overflow partition;

(b) determining an average compression ratio $N \geq 1$;

(c) separating at least a portion of the blocks in both the storage partition and the overflow partition into N slots having a size 1/N of the block size plus space to store N−1 address pointers;

(d) compressing a data block to create a compressed data block;

(e) determining a compression ratio M of the compressed data block;

(f) when $M \leq N$ storing the compressed data block in a first slot in the storage partition;

(g) when M>N, storing a first 1/N of the compressed data block in the first slot in the storage partition and storing a remainder of the compressed data block in one or more slots in the overflow partition, and updating the pointer in the first slot to point to the one or more slots in the overflow partition, whereby storage density of the disk is increased;

(h) providing a bit map for managing empty slots, wherein each bit in the bit map corresponds to one slot on the disk, and a one in a bit in the bit map indicates that the corresponding slot is full, and a zero in the bit indicates that the corresponding slot is empty;

(i) organizing the bits in P-bit words, each word having a word address, wherein each bit address in the word is equal to the word address plus a position of the bit in the word; and (j) using the bit address to indicate an address of the corresponding slot.

* * * * *

UNITED STATES PATENT AND TRADEMARK OFFICE
CERTIFICATE OF CORRECTION

PATENT NO.     : 6,449,689 B1
DATED          : September 10, 2002
INVENTOR(S)    : Corcoran et al.

It is certified that error appears in the above-identified patent and that said Letters Patent is hereby corrected as shown below:

<u>Column 1,</u>
Line 23, paragraph should read as follows:

-- Typically, hard disk drives (HDD) are formatted by physically and logically. Physically, a disk is divided into many equal-sized regions, such as sectors (pie slices) and tracks (concentric circles), so that data can be recorded in a logical manner and accessed quickly by read/write heads that move back and forth over the disk as it spins. Logically, a disk is formatted according to the standards of a host operating system. In a personal computer (PC) for example, the operating system treats the HDD as a sequential list of 512-byte block addresses. --

Signed and Sealed this

Thirteenth Day of May, 2003

JAMES E. ROGAN
*Director of the United States Patent and Trademark Office*